(12) United States Patent
Tsuji et al.

(10) Patent No.: US 6,327,536 B1
(45) Date of Patent: Dec. 4, 2001

(54) VEHICLE ENVIRONMENT MONITORING SYSTEM

(75) Inventors: Takayuki Tsuji; Nobuharu Nagaoka; Masahito Watanabe; Hiroshi Hattori, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/590,980

(22) Filed: Jun. 9, 2000

(30) Foreign Application Priority Data

Jun. 23, 1999 (JP) .................................................. 11-176727

(51) Int. Cl.$^7$ ....................................................... G06F 7/78
(52) U.S. Cl. ............................ 701/301; 701/302; 701/28; 701/70; 701/223; 348/25; 348/113; 348/118; 340/435; 340/436; 340/901
(58) Field of Search ..................................... 701/301, 302, 701/22, 28, 70, 223; 348/25, 113, 118, 119, 169; 340/901, 903, 425.5, 435, 436

(56) References Cited

U.S. PATENT DOCUMENTS 5,475,494 * 12/1995 Nishida et al. ..................... 356/4.01
5,983,161 * 11/1999 Lemelson et al. ................... 701/301

FOREIGN PATENT DOCUMENTS 9-226490    9/1997  (JP) .

* cited by examiner

*Primary Examiner*—Yonel Beaulieu
(74) *Attorney, Agent, or Firm*—Carrier, Blackman & Associates; Joseph P. Carrier; William D. Blackman

(57) ABSTRACT

A vehicle environment monitoring system for an automotive vehicle is capable of accurately detecting the movement of an object existing in an environment of the vehicle, and determining the possibility of collision between the object and the vehicle, thereby appropriately warning the driver. A relative position of the object to the automotive vehicle is detected from the image obtained by a camera mounted on the vehicle to obtain position data. Positions of the object in a real space are calculated based on a plurality of time series items of the position data detected on the object, and a movement vector of the object is calculated based on the positions in the real space. It is determined based on the movement vector whether or not the object has a high possibility of collision against the automotive vehicle.

11 Claims, 13 Drawing Sheets

RIGHT IMAGE

LEFT IMAGE

FIG. 6
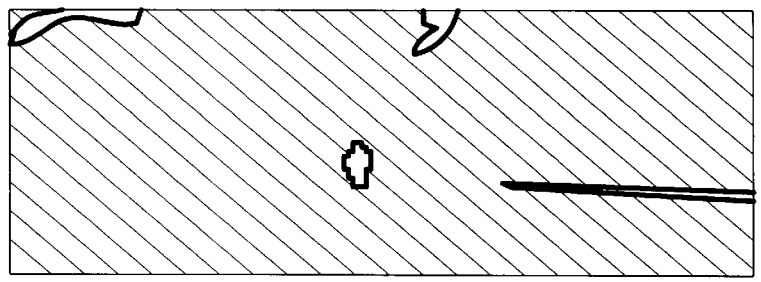
FIG. 7A
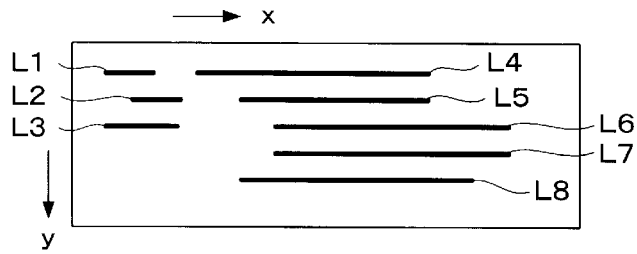
L1: (x3, y3, 2)
L2: (x4, y4, 2)
L3: (x3, y5, 3)
L4: (x7, y3, 8)
L5: (x8, y4, 7)
L6: (x9, y5, 8)
L7: (x9, y6, 8)
L8: (x8, y7, 8)
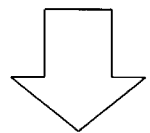
FIG. 7B
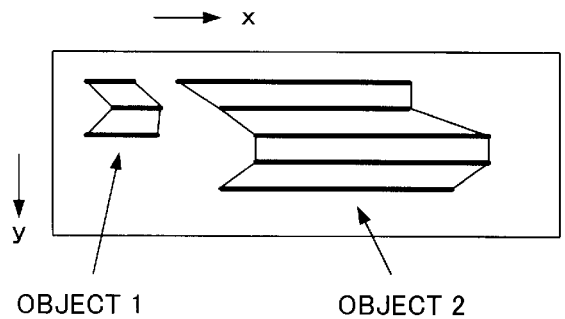
L1: (x3, y3, 2, 1)
L2: (x4, y4, 2, 1)
L3: (x3, y5, 3, 1)
L4: (x7, y3, 8, 2)
L5: (x8, y4, 7, 2)
L6: (x9, y5, 8, 2)
L7: (x9, y6, 8, 2)
L8: (x8, y7, 8, 2)
OBJECT LABEL
FIG. 7C
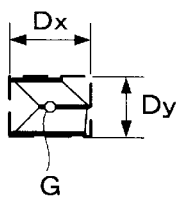
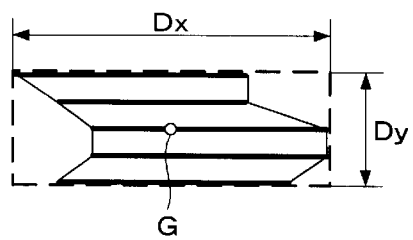

TIME k

TIME (k+1)

RIGHT IMAGE

LEFT IMAGE

FIG. 10
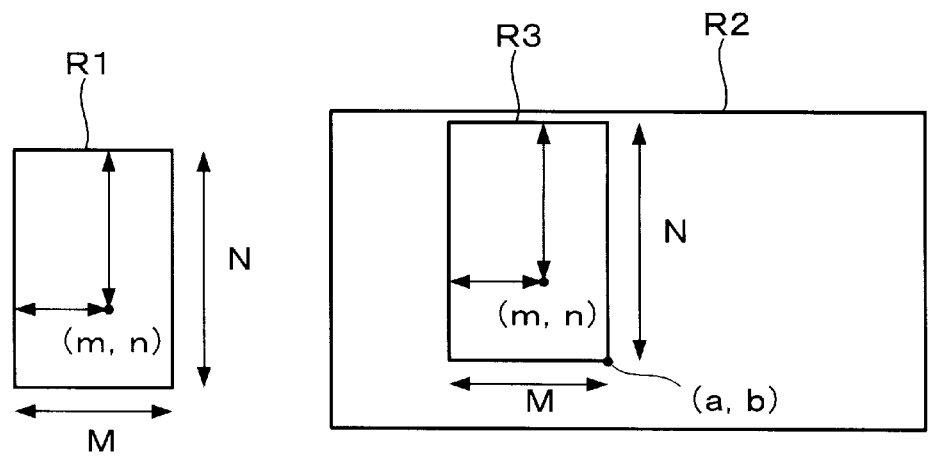
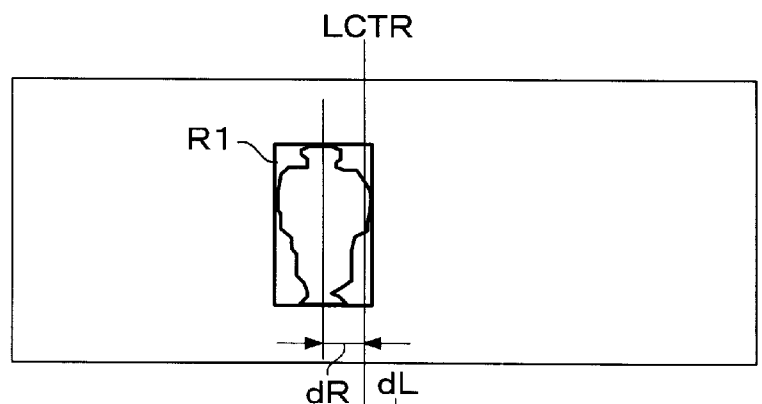
FIG. 11A
RIGHT IMAGE
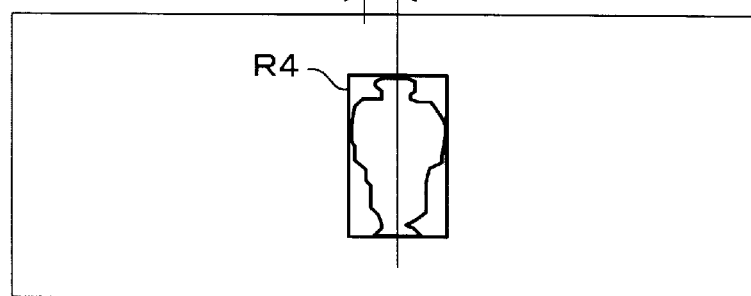
FIG. 11B
LEFT IMAGE

VEHICLE ENVIRONMENT MONITORING SYSTEM

BACKGROUND OF THE INVENTION

1. Field of the Invention

This invention relates to a vehicle environment monitoring system that monitors an environment of an automotive vehicle on which the vehicle is installed. The system detects an object which may collide with the vehicle from an image obtained by an imaging device mounted on the vehicle, thereby avoiding collision against large animals, such as a deer, a bear and the like, since such collision has an adverse influence on the running of the vehicle.

2. Description of the Prior Art

Conventionally, a detection system for detecting an object crossing a road ahead of a vehicle was proposed in Japanese Laid-Open Patent Publication (Kokai) No. 9-226490, the proposed system detects a distance between the vehicle and the object based on the displacement between images of the object, that is, the parallax of images obtained by two CCD (charge-coupled device) cameras mounted on the vehicle, thereby detecting a pedestrian 30 to 60 meters ahead of the vehicle.

However, the above conventional apparatus determines the possibility of collision against an object by using the direction of an optical flow of the object detected based on images of the object obtained by the cameras, without further processing, which results in degraded determining accuracy depending on a relative distance between the vehicle and the object, and the speed of the vehicle. That is, when a vehicle speed is much higher than the speed of a moving object, an optical flow on the image, which corresponds e.g. to an object actually moving toward the center of a road, is sometimes tracked as a vector extending outside the road, which causes an erroneous determination of the possibility of potential collision.

SUMMARY OF THE INVENTION

It is an object of the invention to provide a vehicle environment monitoring system, which is capable of more accurately detecting the movement of an object existing in an environment of the vehicle, and determining the possibility of collision between the object and the vehicle, for thereby more appropriately warning the driver of such possibility.

To attain the above object, the present invention provides a vehicle environment monitoring system for an automotive vehicle, which detects an object existing in an environment of the automotive vehicle from an image obtained by imaging means mounted on the automotive vehicle.

The vehicle environment monitoring system is characterized by comprising:

relative position-detecting means for detecting a relative position of the object to the automotive vehicle from the image obtained by the imaging means to obtain position data;

movement vector-calculating means for calculating positions of the object in a real space based on a plurality of time series items of the position data detected on the object by the relative position-detecting means, and calculating a movement vector of the object based on the positions in the real space; and determining means for determining whether or not the object has a high possibility of collision against the automotive vehicle based on the movement vector.

According to this vehicle environment monitoring system, the relative position of the object to the automotive vehicle is detected from the image obtained by the imaging means to obtain position data, the and the positions of the object in a real space are calculated based on a plurality of time series items of the position data detected on the object. Then, a movement vector of the object is calculated based on the positions of the object in the real space, and it is determined whether or not the object has a high possibility of collision against the automotive vehicle based on the movement vector. Therefore, differently from the conventional system, it is possible to prevent the occurrence of an erroneous determination, and thereby enhance accuracy of the determination of the possibility of collision.

Preferably, the movement vector-calculating means includes approximate straight line-calculating means for calculating an approximate straight line approximating a locus of relative movement of the object, and position data-correcting means for correcting the time series items of the position data by using the approximate straight line, and the movement vector-calculating means calculates the movement vector based on the corrected time series items of the position data.

According to this preferred embodiment, an approximate straight line approximating a locus of relative movement of the object is calculated, and the time series items of the position data are corrected by using the approximate straight line. The movement vector is calculated based on the corrected time series items of the position date. Therefore, it is possible to reduce adverse influence of errors in detection of the position data, and more accurately estimate the possibility of collision against the object in advance.

Preferably, the determining means carries out the determination by applying conditions for determining a potential collision, the conditions being dependent on a width of the vehicle.

According to this preferred embodiment, the possibility of collision is determined by applying conditions for determining a potential collision, which are dependent on the width of the vehicle. This makes it possible to more accurately determine the possibility of collision and prevent the driver from being unnecessarily warned.

More preferably, the approximate straight line-calculating means calculates the approximate straight line, as a three-dimensional straight line including data of a height of the object.

According to this preferred embodiment, it is possible to accurately determine the possibility of collision, even when the driver is driving on a hilly road.

Preferably, the imaging means comprises two infrared cameras capable of detecting infrared rays.

According to this preferred embodiment, an animal, running automotive vehicle, and the like can easily be detected, even when the driver is driving at night and it is difficult to recognize them.

Preferably, the imaging means comprises two TV cameras for detecting infrared rays or visible rays, and the relative position-detecting means includes search area-setting means for setting, based on a position of an object image contained in an image output from one of the two TV cameras, a search area within an image output from the other of the two TV cameras for searching for a corresponding object image contained in the image output from the other of the two TV cameras, corresponding object image-identifying means for identifying the corresponding object image by carrying out a correlation operation on data within the search area, and distance-calculating means for calculating a distance from the vehicle to the object based on a parallax between the object image and the corresponding object image.

More preferably, the data within the search area is gray scale data containing halftone information.

According to this preferred embodiment, by using not binary data but gray scale data, it is possible to effect more accurate correlation operation, thereby preventing erroneous identification of a corresponding object image.

Further preferably, the relative position-detecting means includes tracking means for tracking an object moving in the image obtained by the imaging means, by using binary data formed by binarizing the gray scale data.

Even more preferably, the tracking means recognizes the object being tracked by using run length data encoded from the binary data.

According to this preferred embodiment, it is possible to reduce the amount of data concerning the object being tracked, thereby saving the capacity of the memory device.

Still more preferably, the tracking means determines an identity of the object being tracked, based on position coordinates of a centroid of an image thereof, an area of the image thereof, and an aspect ratio of a rectangle circumscribing the image thereof.

According to this preferred embodiment, it is possible to accurately determine the identity of an object being tracked.

Preferably, the vehicle environment monitoring system includes warning means for warning a driver, when it is determined by the determining means that there is a high possibility of collision against the object, and the warning means is inhibited from warning the driver when the driver is carrying out a braking operation and at the same time deceleration caused by the braking operation is larger than a predetermined threshold.

According to this preferred embodiment, the driver is not warned when he has already recognized the object and is carrying out an appropriate braking operation. This makes it possible to prevent the driver from being annoyed by an unnecessary warning.

The above and other objects, features, and advantages of the invention will become more apparent from the following detailed description taken in conjunction with the accompanying drawings.

BRIEF DESCRIPTION OF THE DRAWINGS

FIGS. 5A and 5B are diagrams each showing halftone portions as hatched areas, which are useful in explaining gray scale images obtained by infrared cameras in which:

FIG. 5A shows a right image obtained by a right one of the infrared cameras;

FIG. 5B shows a left image obtained by a left one of the same;

FIG. 6 is a diagram showing a black area as a hatched one, which is useful in explaining an image formed by binarization of a gray scale image;

FIGS. 7A to 7C are diagrams which are useful in explaining a process for converting binarized image data to run length data and labeling of objects for identification thereof;

FIGS. 10 are diagrams useful in explaining a correlation operation carried out on data within the search area;

FIGS. 11A and 11B are diagrams useful in explaining a method of calculating a parallax;

DETAILED DESCRIPTION

The invention will now be described in detail with reference to drawings showing an embodiment thereof.

Figure 1:
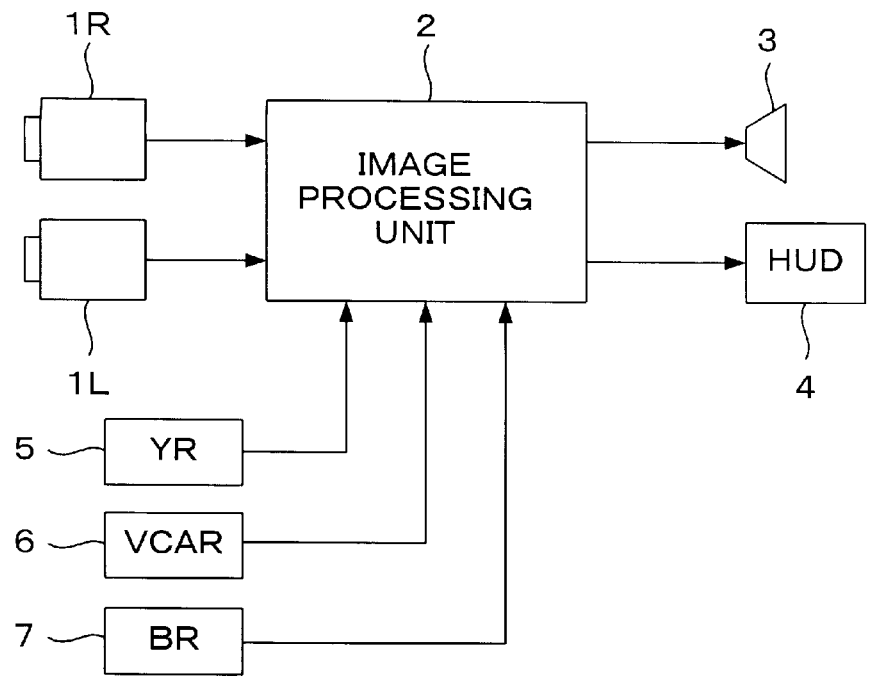
FIG. 1 is a block diagram showing the arrangement of a vehicle environment monitoring system according to an embodiment of the invention.

Referring first to FIG. 1, there is shown the arrangement of a vehicle environment monitoring system, according to the embodiment of the invention, which has two right and left infrared cameras 1R, 1L capable of detecting far-infrared rays, a yaw rate sensor 5 for detecting yaw rate of the vehicle, a vehicle speed sensor 6 for detecting traveling speed (vehicle speed) VCAR of the vehicle, a brake sensor 7 for detecting an operation amount of a brake, not shown, an image-processing unit 2 for detecting an object, such as an animal or the like, ahead of the vehicle based on image data obtained by the above cameras 1R, 1L and warning the driver when there is a high possibility of collision against the object, a speaker 3 for generating a voice alarm for warning the driver, and a head up display (hereinafter referred to as the "HUD") 4 for displaying an image obtained by the camera 1R or 1L and causing the driver to recognize the object having the high possibility of collision against the vehicle.

Figure 2:
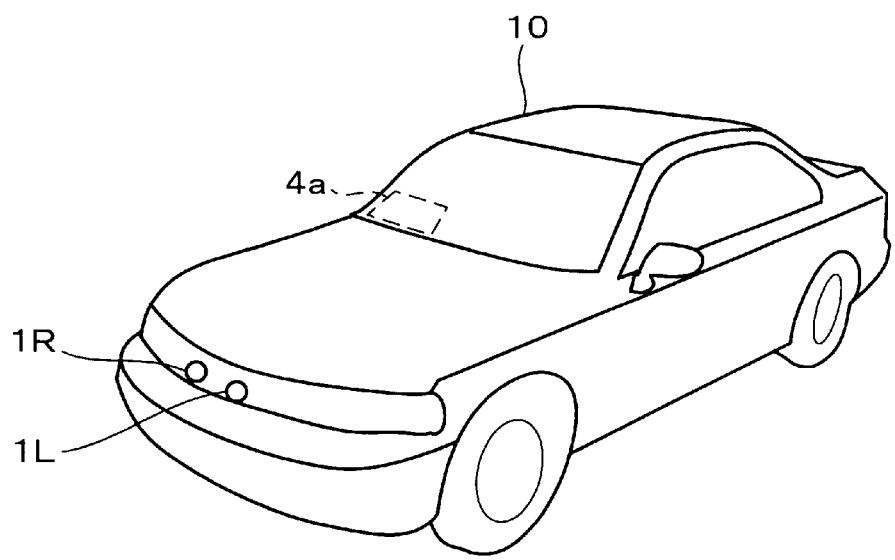
FIG. 2 is a diagram illustrating portions of a vehicle at which the cameras appearing in FIG. 1 are mounted.

As shown in FIG. 2, the cameras 1R, 1L are arranged in a front portion of the automotive vehicle 10 at locations symmetric with respect to the longitudinal central axis of the vehicle 10, and rigidly fixed to the vehicle such that the two cameras 1R, 1L have optical axes in parallel with each other and equal heights from a road surface. The infrared cameras 1R, 1L have a characteristic that the output signal level becomes higher (the luminance of an image of an object increases) as the temperature of the object becomes higher.

The image-processing unit 2 includes an A/D converter circuit for converting input analog signals to digital signals, an image memory for storing digitized image signals, a CPU (Central Processing Unit) for carrying out arithmetic operations, a RAM (Random Access Memory) used by the CPU for storing data being processed in the arithmetic operations, a ROM (Read Only Memory) storing programs executed by the CPU, tables, and maps, and an output circuit for outputting driving signals to the speaker 3, display signals to the HUD 4, and the like.

Output signals from the cameras 1R, 1L and the sensors 5 to 7 are converted to digital signals and input to the CPU.

As shown in FIG. 2, the HUD 4 is arranged such that a screen 4a thereof is displayed in a front window at a location ahead of the driver.

Figure 3:
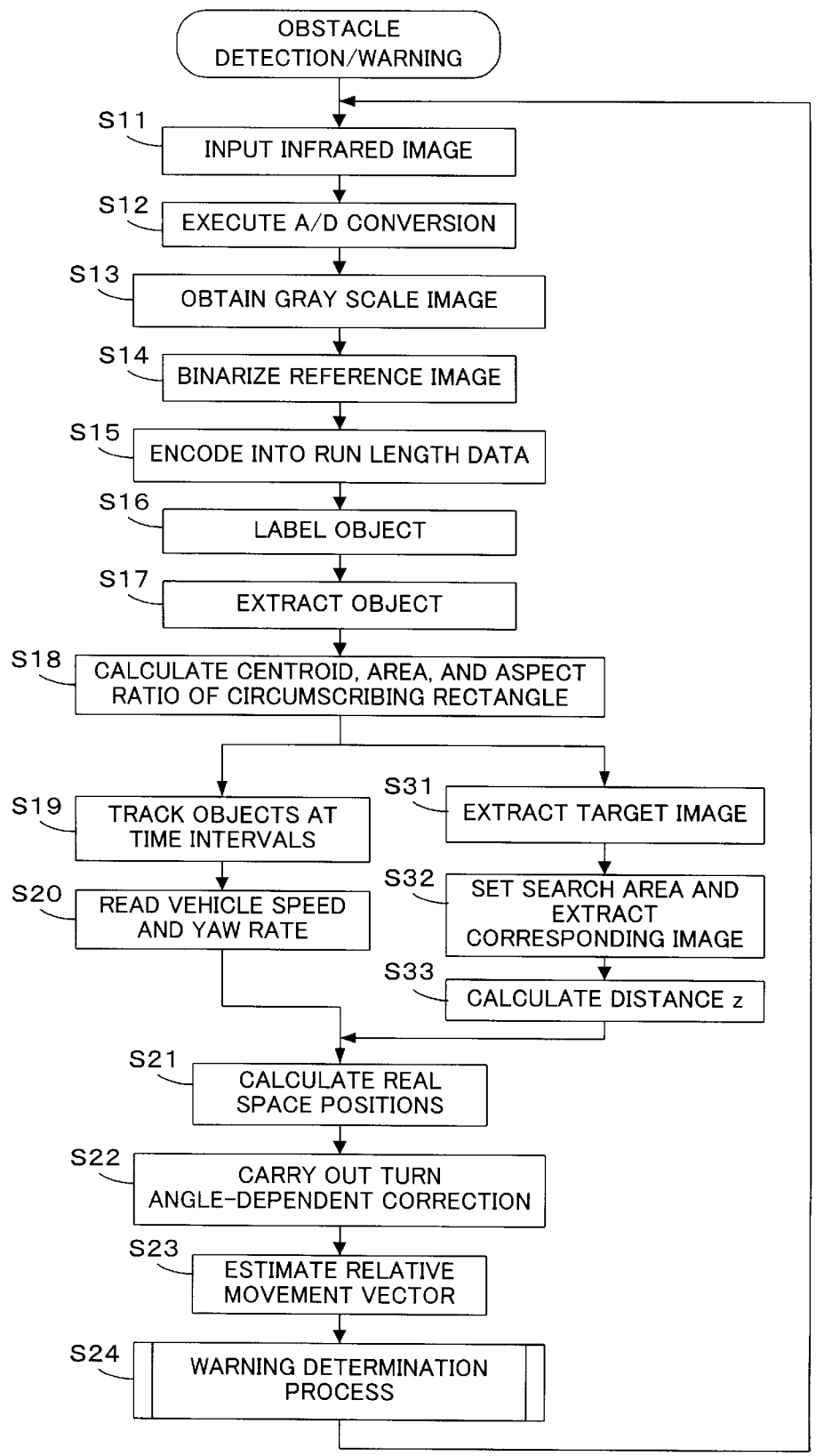
FIG. 3 is a flowchart showing a procedure of processing executed by an image-processing unit appearing in FIG. 1.
Figure 5A:
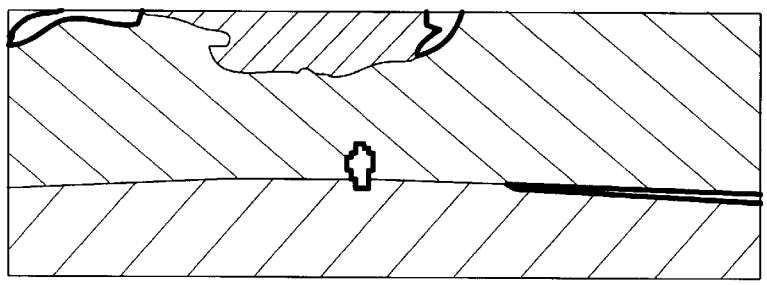
Figure 5B:
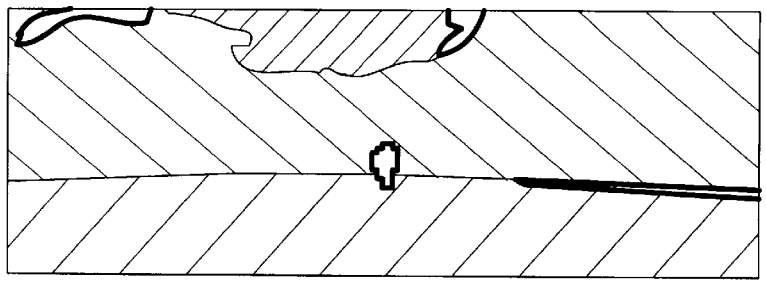

FIG. 3 is a flowchart showing a procedure of processing executed by the image-processing unit 2. First, output signals from the cameras 1R, 1L are subjected to A/D conversion by the A/D converter circuit and the resulting digital data are stored in the image memory (steps S11, S12, S13). Data of images stored in the image memory is data of gray scale images including luminance information. FIGS. 5A and 5B are diagrams for explaining gray scale images obtained by the respective cameras 1R, 1L (a right image by the camera 1R, and a left image by the camera 1L). Hatched areas in the right and left images are halftone (gray) areas, while areas surrounded by thick solid lines are areas at a high luminance level (at a high temperature) which are areas (hereinafter referred to as "high luminance areas") of detected objects displayed in white on the screen. In the right image and the left image, an identical object is displayed as images at respective locations horizontally displaced from each other, so that it is possible to calculate a distance from the vehicle 10 to the object based on the displacement (parallax).

At step S14 in FIG. 3, the right image is set to a reference image, and the digital image data representative of the reference image is binarized (converted to 1-bit data) such that an area at a level of luminance equal to or higher than a luminance threshold ITH experimentally determined is set to "1" (white) and an area at a lower level of luminance than the threshold ITH is set to "0" (black). FIG. 6 shows an image obtained by binarization of the FIG. 5A image. In the figure, a hatched area represents a black area, while areas surrounded by thick solid lines (high luminance areas) represent respective white areas.

At the following step S15, the binarized image data is encoded into run length data. FIG. 7A is a diagram for explaining the encoding process. In the figure, areas set to white by the above binarization are represented by lines L1 to L8 indicative of respective lines of pixels. Although the lines L1 to L8 each have a width of one pixel in the y direction, and are actually arranged side by side without any gaps in the y direction, they are shown as separate lines spaced from each other for clarity of description. Further, the lines L1 to L8 have respective lengths of two pixels, two pixels, three pixels, eight pixels, seven pixels, eight pixels, eight pixels, and eight pixels in the x direction. The run length data represents each of the lines L1 to L8 by the coordinates of the starting point (point of the left end) of the line and the length (the number of pixels) of the line from the starting point to the ending point (point of the right end) of the same. For instance, the line L3 is formed of three pixels (x3, y5), (x4, y5) and (x5, y5), and represented by the run length data (x3, y5, 3).

At steps S16 and S17, an object is extracted by labeling the same, as shown in FIG. 7B. That is, out of the lines L1 to L8 encoded into the run length data, the lines L1 to L3 overlapping in the y direction are regarded as one object 1, and the lines L4 to L8 overlapping in the y direction are regarded as one object 2, whereby object labels 1 and 2 are added to the run length data. This processing enables e.g. the high luminance areas appearing in FIG. 6 to be grasped as objects 1 to 4, respectively.

At step S18, as shown in FIG. 7C, the centroid G of an extracted object (image of an object), the area S of the extracted object, and the aspect ratio ASPECT of a rectangle circumscribing the extracted object, indicated by broken lines, are calculated. The area S is calculated by integrating the lengths of the run length data of an identical object. The coordinates of the centroid G is calculated as the x coordinate of a line equally dividing the area S along the y direction into halves, and the y coordinate of a line equally dividing the area S along the x direction into halves. The aspect ratio ASPECT is calculated as Dy/Dx which is a ratio of Dy to Dx appearing in FIG. 7C. It should be noted that the position of the centroid of the circumscribing rectangle may be used in place of that of the centroid G of the extracted object.

Figure 8A:
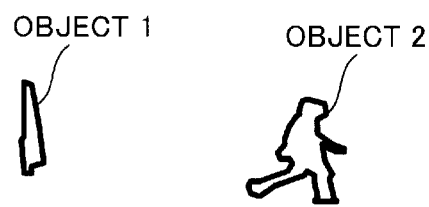
FIGS. 8A and 8B are diagrams useful in explaining how objects are tracked at time intervals.

At step S19, objects are tracked at time intervals, that is, identification or recognition of identical objects is carried out whenever each sampling repetition period elapses. Assuming that a time obtained by discretizing time t as an analog amount by a sampling repetition period is represented by k, objects 1 and 2 extracted at time k, as shown in FIG. 8A, and objects 3 and 4 extracted at time (k+1) as shown in FIG. 8A are checked as to their identity. More specifically, it is determined that the objects 3 and 4 are identical with the respective objects 1 and 2 when the following identification conditions (1) to (3) are satisfied, and the objects 3 and 4 are labeled as objects 1 and 2 to thereby track the objects at time intervals:

(1) Assuming that the position coordinates of the centroid of objects i (=1, 2) in an image at time k are represented by (xi(k), yi(k)), and the position coordinates of the centroid of objects j (=3, 4) in an image at time (k+1) are represented by (xj(k+1), yj(k+1)), the following conditions are satisfied:

$$|xj(k+1)-xi(k)|<\Delta x, \text{ and}$$

$$|yj(k+1)-yi(k)|<\Delta y$$

wherein $\Delta x$ and $\Delta y$ represent maximum allowable values for respective distances covered by the object moving in the image in the x direction and the y direction.

(2) Assuming that the areas of the objects i (=1, 2) in the image at time k are represented by Si(k), and the areas of the objects j (=3, 4) in the image at time (k+1) are represented by Sj(k+1), the following condition is satisfied:

$$Sj(k+1)/Si(k)<1\pm\Delta S$$

wherein $\Delta A$ represents a maximum allowable value for a change in the area.

(3) Assuming that the aspect ratios of rectangles circumscribing the objects i (=1, 2) at time k are represented by ASPECT i(k), and the aspect ratios of rectangles circumscribing the objects j (=3, 4) at time (k+1) are represented by ASPECT j(k+1), the following condition is satisfied:

$$\text{ASPECT } j(k+1)/\text{ASPECT } i(k)<1\pm\Delta\text{ASPECT}$$

wherein $\Delta\text{ASPECT}$ represents a maximum allowable value for a change in the aspect ratio.

Figure 8B:

When comparison is made between FIG. 8A and FIG. 8B, the size of each object is increased in FIG. 8B, but the objects 1 and 3 satisfy the above identification conditions, and the objects 2 and 4 satisfy the above identification conditions. Hence, the objects 3 and 4 can be identified with the respective objects 1 and 2. The position coordinates (of the centroid) of each object thus identified are stored in the memory as time series items of position data, and used for carrying out subsequent arithmetic operations.

It should be noted that the above-mentioned processes at steps S14 to S19 are executed on the binarized reference image (the right image in the present embodiment).

At step S20 in FIG. 3, the vehicle speed VCAR detected by the vehicle speed sensor 6 and the yaw rate YR detected by the yaw rate sensor 5 are read in for integration of the yaw rate YR over time, whereby the angle θr of turn of the automotive vehicle 10 (see FIG. 14) is calculated.

On the other hand, at steps S31 to S33, an operation for calculating a distance z between the object and the automotive vehicle 10 is carried out in parallel with the processes at steps S19 and 20. This arithmetic operation takes a longer time period than the processes at steps S19 and 20, and hence it is executed at a longer repetition period than that of the processes at steps S 19 and 20 (approximately three times as long as a repetition period of execution of the processes from step S11 to step S20).

Figure 9A:
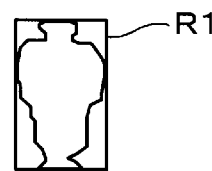
FIG. 9A is a diagram useful in explaining a target image in the right image.
Figure 9B:
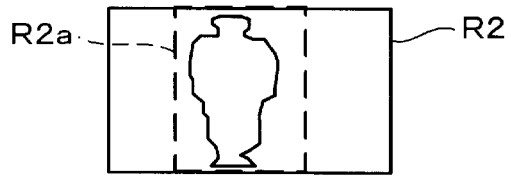
FIG. 9B is a diagram useful in explaining a search area set in the left image.

At step S31, one of objects tracked by using the binarized image of the reference image (right image) is selected, whereby as shown in FIG. 9A, a target image R1 (whole area surrounded by a circumscribing rectangle is set to a target image in this example) is extracted from the right image. At the following step S32, a search area for searching an image (hereinafter referred to as the "corresponding image") corresponding to the target image is set within the left image, and the corresponding image is extracted by performing a correlation operation. More specifically, as shown in FIG. 9B, a search area R2 is set in the left image based on the coordinates of each vertex of the target image R1, and the total sum value C (a, b) of luminance differences indicative of a degree of correlation with the target image R1 is calculated as to data within the search area R2 by using the following equation (1), whereby an area which provides the minimum value of the total sum value C (a, b) is extracted as the corresponding image. It should be noted that the correlation operation is carried out not by using data of binarized images (binary data) but by using data of gray scale images (gray scale data). Further, when position data of an identical object obtained in the past is available, an area R2a (shown by broken lines in FIG. 9B) narrower than the search area R2 is set to the search area based on the position data.

$$C(a, b) = \sum_{n=0}^{N-1}\sum_{m=0}^{M-1} |IL(a + m - M, b + n - N) - IR(m, n)| \quad (1)$$

wherein IR (m, n) represents a luminance value of a position shown by coordinates (m, n) in the target image R1 appearing in FIG. 10A, and IL(a+m−M, b+n−N) represents a luminance value of a position shown by coordinates (m, n) in a local area R3 having the same shape as that of the target image R1 with a reference point (origin of its own coordinate system) set to coordinate (a, b) in the search area R2 as indicated in FIG. 10B. A position minimizing the total sum value C (a, b) of the luminance differences is obtained by changing the coordinates (a, b) of the reference point, whereby the position of the corresponding image can be determined.

Figure 12:
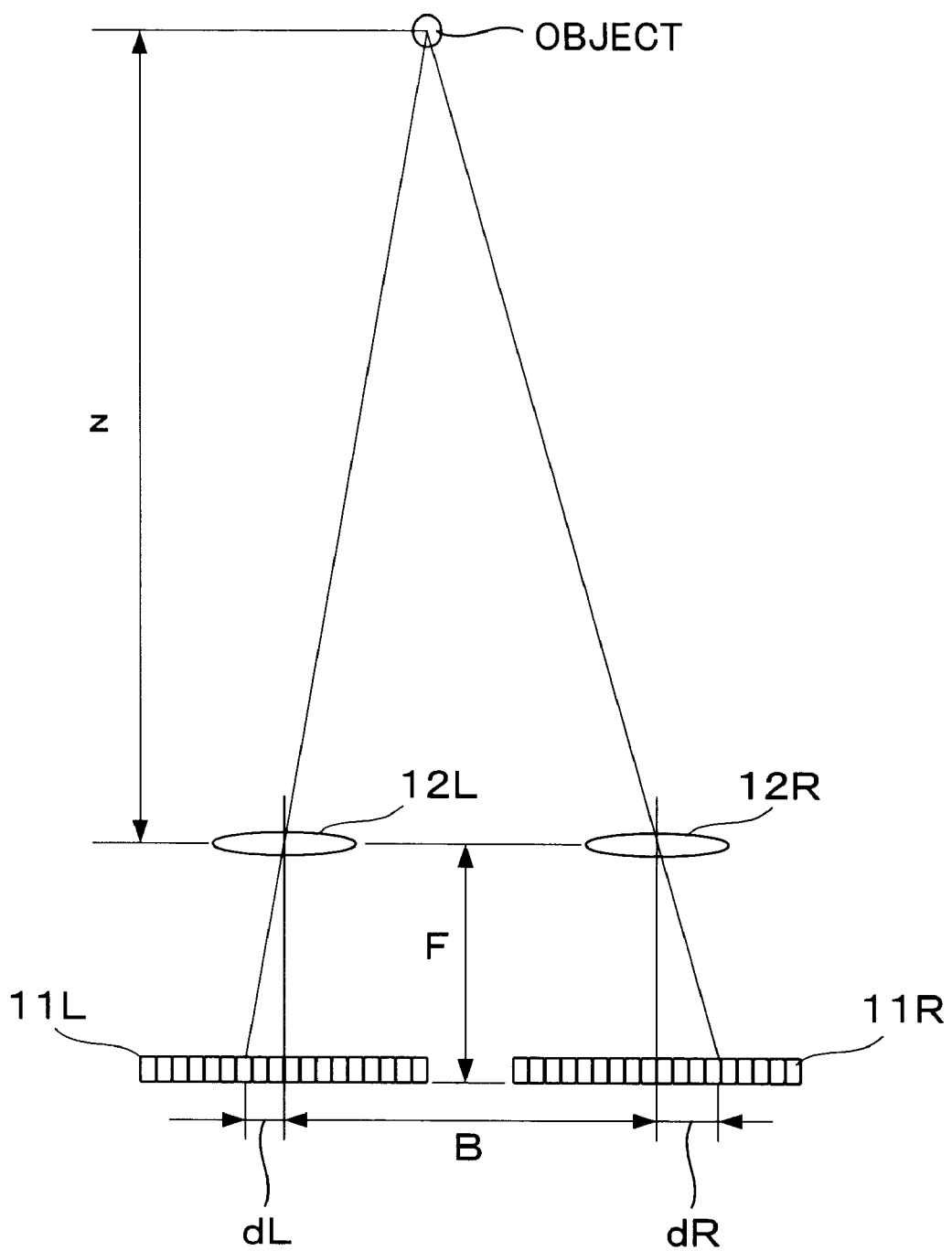
FIG. 12 is a diagram useful in explaining a method of calculating a distance between the vehicle and the object based on the parallax.

After the target image R1 and the corresponding image R4 corresponding to this target image R1 as shown in FIGS. 11A and 11B are extracted at step S32, then at step S33, a distance dR (the number of pixels) between the centroid of the target image R1 and a center line LCTR of the right image, and a distance dL (the number of pixels) between the centroid of the corresponding image R4 and a center line LCTR of the left image are determined, and applied to the following equation (2) to calculate a distance z between the automotive vehicle 10 and the object.

$$z = \frac{B \times F}{(dL + dR) \times p} = \frac{B \times F}{\Delta d \times p} \quad (2)$$

wherein B designates the length of a baseline, that is, a horizontal distance (in the x direction) between the center position of an imaging element 11R of the camera 1R and the center position of an imaging element 11L of the camera 1L (i.e. distance between the optical axes of the respective cameras), as shown in FIG. 12; F designates the focal distance of lenses 12R, 12L; p designates a space interval between pixels in the imaging elements 11R, 11L; and Δd (=dR+dL) represents the amount of parallax.

Figure 13A:
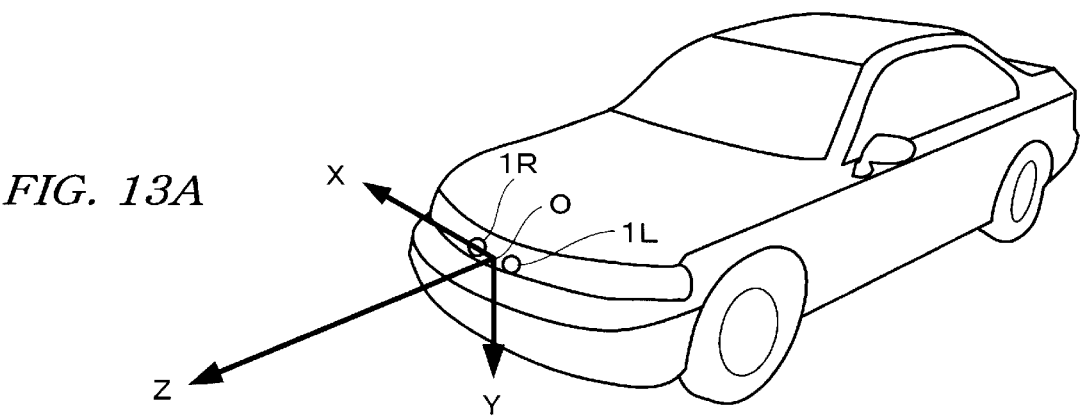
FIGS. 13A and 13B are diagrams useful for explaining a coordinate system used in the present embodiment.
Figure 13B:
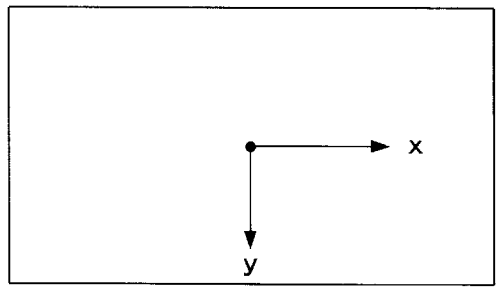

At step S21, coordinates (x, y) in the image and the distance z calculated by using the equation (2) are applied to the following equations (3) for conversion to real space coordinates (X, Y, Z). Here, the coordinate system of the real space coordinates (X, Y, Z) (real space coordinate system) is defined as shown in FIG. 13A with the position of a mid point (position fixed on the automotive vehicle 10) of mounting positions at which the cameras 1R, 1L are mounted being set to an origin O of the real space coordinate system, and coordinates in a coordinate system of an image (imaginary image, referred to hereinafter) corresponding to the real coordinate system is defined as shown in FIG. 13B, with the center of the image being set to the origin of the coordinate system corresponding to the real space coordinate system, the horizontal direction being defined as the x direction, and the vertical direction being defined as the y direction.

$$\begin{bmatrix} X \\ Y \\ Z \end{bmatrix} = \begin{bmatrix} xc \times z/f \\ yc \times z/f \\ z \end{bmatrix} \quad f = F/p \quad (3)$$

In these equations, (xc, yc) are obtained by converting the coordinates (x, y) in the coordinate system of the right image to coordinates in the coordinate system of the imaginary image, the center of which is caused to coincide with the origin O of the real space coordinate system, based on the relative relationship of the mounting position of the camera 1R and the origin O of the real space coordinate system. Further, f represents a ratio between the focal distance F and the pixel-to-pixel space interval p.

Figure 14:
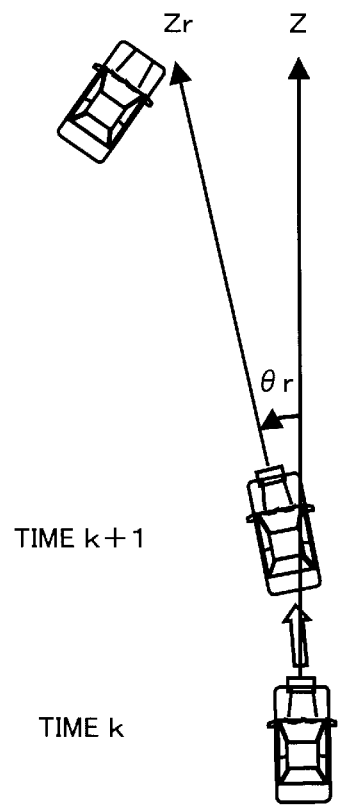
FIG. 14 is a diagram useful in explaining a turn angle-dependent correction of position data of an object.
Figure 15:
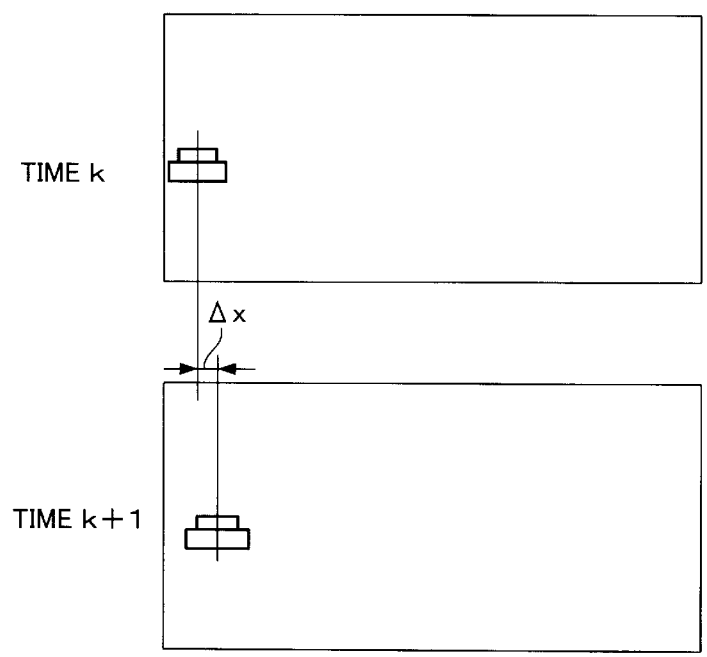
FIG. 15 is a diagram showing the displacement of the object in the images due to turn of the vehicle.

At step S22, a turn angle-dependent correction of position data of each object is carried out by compensating for positional displacement of the object in the image due to turning of the vehicle 10, according to the angle of turn. Assuming that the vehicle 10 makes a turn, as shown in FIG. 14, e.g. in a leftward direction through an angle θr of turn during a time period from a time k to a time (k+1), an image obtained by the camera is displaced by Δx in the x direction, as shown in FIG. 15. The turn angle-dependent correction at step S22 is carried out to compensate for the displacement of the image. More specifically, the real space coordinates (X, Y, Z) are applied to the following equation (4) to calculate corrected coordinates (Xr, Yr, Zr). Real space position data (Xr, Yr, Zr) thus calculated is stored in the memory in a manner correlated to each corresponding object. Further, in the following description, the corrected coordinates are denoted as coordinates (X, Y, Z).

$$\begin{bmatrix} Xr \\ Yr \\ Zr \end{bmatrix} = \begin{bmatrix} \cos\theta r & 0 & -\sin\theta r \\ 0 & 1 & 0 \\ \sin\theta r & 0 & \cos\theta r \end{bmatrix} \begin{bmatrix} X \\ Y \\ Z \end{bmatrix} \quad (4)$$

Figure 16:
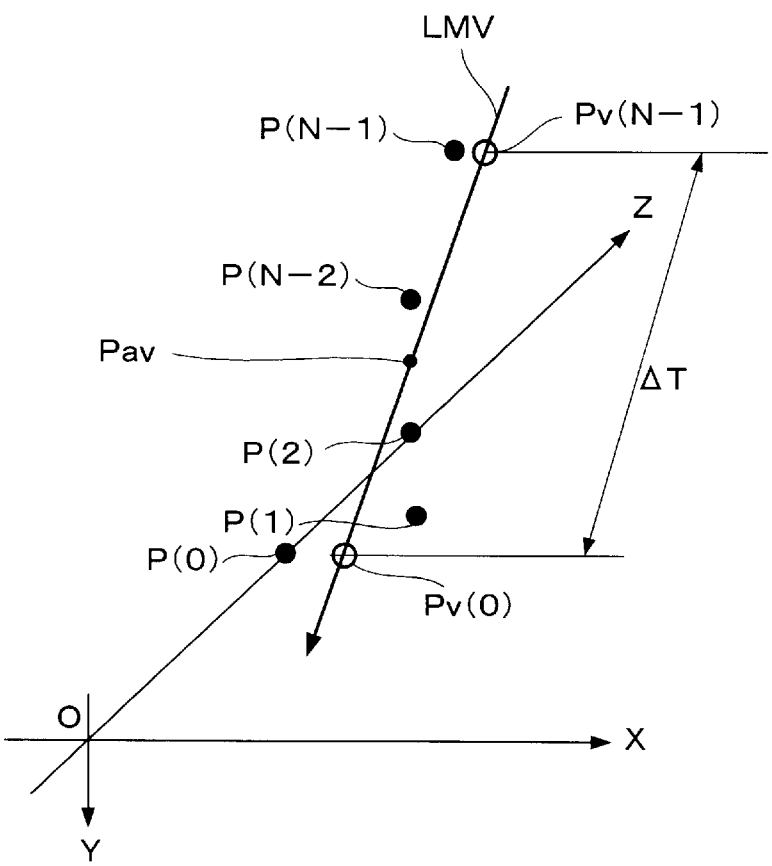
FIG. 16 is a diagram useful in explaining a method of calculating a relative movement vector.

At step S23, as shown in FIG. 16, an approximate straight line LMV corresponding to a relative movement vector between an identical object and the automotive vehicle 10 is obtained based on N real space position data items, i.e. time series position data (N is a number equal to or close to 10, for instance) after the turn angle-dependent correction, which were obtained during a time period ΔT. More specifically, assuming that a direction vector indicative of the direction of the approximate straight line LMV is represented by L=(lx, ly, lz) (|L|=1), a straight line represented by the following equations (5) is determined:

$$X = u \cdot lx + Xav \quad (5)$$
$$Y = u \cdot ly + Yav$$
$$Z = u \cdot lz + Zav$$
$$Xav = \sum_{j=0}^{N-1} X(j)/N$$
$$Yav = \sum_{j=0}^{N-1} Y(j)/N$$
$$Zav = \sum_{j=0}^{N-1} Z(j)/N$$

wherein u represents a parameter capable of having an arbitrary value, and Xav, Yav and Zav represent the average value of X coordinates, the average value of Y coordinates, and the average value of Z coordinates, respectively, of series of real space position data.

Further, if the parameter u is eliminated from the equations (5), the following equation (5a) is obtained:

$$(X-Xav)/lx=(Y-Yav)/ly=(Z-Zav)/lz \quad (5a)$$

FIG. 16 is a diagram illustrating the approximate straight line LMV. In the figure, P(0), P(1), P(2), . . . , P(N-2), P(N-1) designate points indicated by respective time series position data items (data points) after the turn angle-dependent correction. The approximate straight line LMV is determined as a straight line which extends through the average position coordinates Pav (=Xav, Yav, Zav) of the time series position data item, and minimizes an average value of the squares of respective distances between the line and the data points. Here, a numeric value in parentheses added to each P indicating the coordinates of each data point (position coordinates) shows that the larger the numeric value is, the older the data item having the numeric value is. For instance, P(0) indicates the latest position coordinates, P(1) indicates position coordinates obtained one sampling repetition period earlier, and P(2) indicates position coordinates obtained two sampling repetition periods earlier. The same applies to D(j), X(j), Y(j), Z(j) and the like referred to hereinafter.

More specifically, inner products s of vector D(j)=(DX(j), DY(j), DZ(j))=(X(j)-Xav, Y(j)-Yav, Z(j)-Zav) which extend from the average position coordinates Pav to the coordinates P(0) to P(N-1) of the respective data points and a direction vector L are calculated by the following equation (6), and the direction vector L=(lx, ly, lz) maximizing the variance of the inner products s is determined.

$$s=lx \cdot DX(j)+ly \cdot DY(j)+lz \cdot DZ(j) \quad (6)$$

A variance-covariance matrix V of the coordinates at the respective data points is represented by the following equation (7). Since a characteristic value σ for this variance-covariance matrix V corresponds to the variance of the inner products s, a characteristic vector corresponding to the largest one of three characteristic values calculated from the matrix becomes the direction vector L desired to be obtained. It should be noted that in order to calculate characteristic values and a characteristic vector from the matrix of the equation (7), a method known as Jacobian method (described e.g. in "Suuchi-Keisan Handbook (Handbook of Numeral Calculus)" (published by Ohmsha, Ltd, Tokyo, Japan)) is used.

$$V = \frac{1}{N-1} \begin{bmatrix} \sum_{j=0}^{N-1} DX(j)^2 & \sum_{j=0}^{N-1} DX(j) \cdot DY(j) & \sum_{j=0}^{N-1} DX(j) \cdot DZ(j) \\ \sum_{j=0}^{N-1} DX(j) \cdot DY(j) & \sum_{j=0}^{N-1} DY(j)^2 & \sum_{j=0}^{N-1} DY(j) \cdot DZ(j) \\ \sum_{j=0}^{N-1} DX(j) \cdot DZ(j) & \sum_{j=0}^{N-1} DY(j) \cdot DZ(j) & \sum_{j=0}^{N-1} DZ(j)^2 \end{bmatrix} \quad (7)$$

Next, the latest position coordinates P(0)=(X(0), Y(0), Z(0)), and the position coordinates P(N-1)=(X(N-1), Y(N-1), Z(N-1)) obtained (N-1) sampling repetition periods (time period ΔT) earlier are corrected such that positions thereof are on the approximate straight line LMV. More specifically, by applying the Z coordinates, Z(0), Z(N-1) to the above-mentioned equation (5a), that is, by using the following equations (8), corrected position coordinates Pv(0)=(Xv(0), Yv(0), Zv(0)) and corrected position coordinates Pv(N-1)=Xv(N-1), Yv(N-1), Zv(N-1) are calculated.

$$Xv(j) = (Z(j) - Zav) \times \frac{lx}{lz} - Xav \quad (8)$$
$$Yv(j) = (Z(j) - Zav) \times \frac{ly}{lz} - Yav$$
$$Zv(j) = Z(j) \qquad j = 0, N-1$$

As the vector extending from the position coordinates Pv(N-1) to the position coordinates Pv(0) calculated by the equations (8), the aforementioned relative movement vector can be obtained. As described above, an approximate straight line approximating the locus of relative movement of an object to the automotive vehicle 10 is calculated based on a plurality of (N) data items of position data during a monitoring time period ΔT, and a relative movement vector is determined based on the approximate straight line. This makes it possible to reduce adverse influence of position detection errors, and more accurately estimate the possibility of collision against the object in advance.

Now, referring again to FIG. 3, at step S24, a warning determination process (FIG. 4) is carried out by determining whether or not there is a possibility of collision against the detected object, and issuing a warning if there is a high possibility of the collision.

Figure 4:
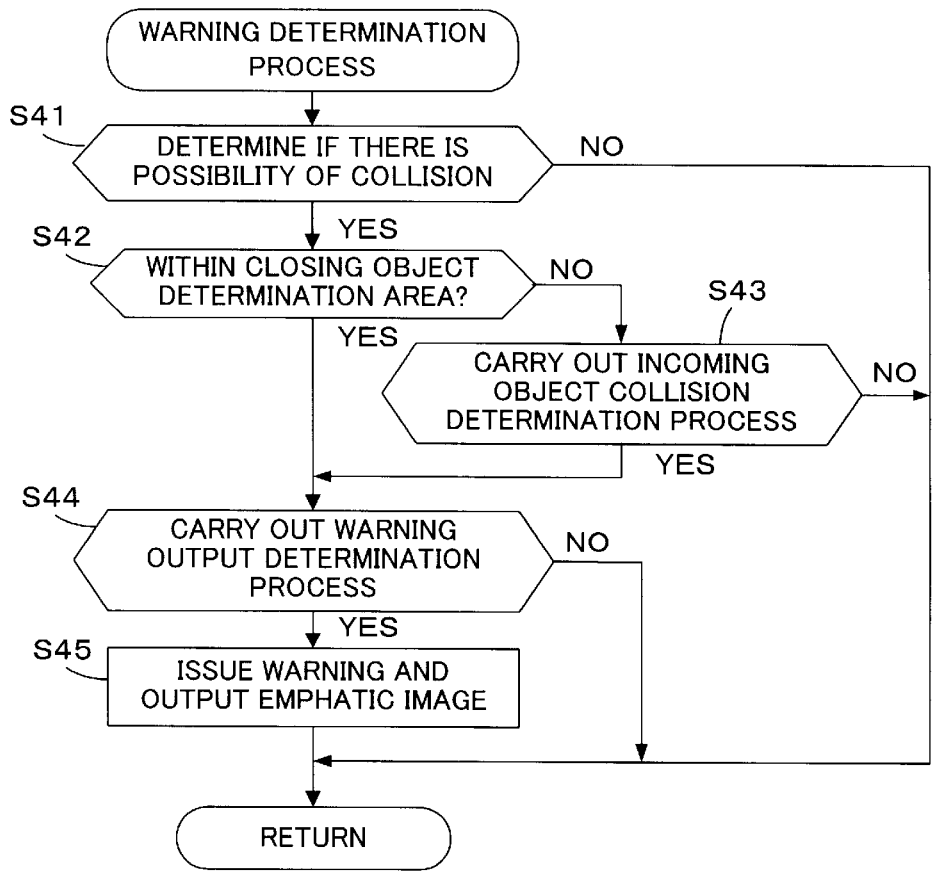
FIG. 4 is a flowchart showing details of a warning determination process in FIG. 3.

At step S41 in FIG. 4, a relative speed Vs in the Z direction is calculated by the following equation (9). When the following expressions (10) and (11) are satisfied, it is determined that there is a possibility of collision, and the program proceeds to step S42. If the expression (10) and/or the expression (11) are/is not satisfied, the warning determination process is terminated.

$$Vs=(Zv(N-1)-Zv(0))/\Delta T \qquad (9)$$

$$Zv(0)/Vs \leq T \qquad (10)$$

$$|Yv(0)| \leq H \qquad (11)$$

In the above expressions, Zv(0) represents the latest detected distance value (although v is added to the symbol to indicate that the symbol represents a value of a data item corrected by using the approximate straight line LMV, the Z coordinate itself has the same value as it has before the correction), and Zv(N−1) represents a distance value detected a time period ΔT earlier. Further, T represents a lead time provided so as to enable determining the possibility of collision a time period T earlier than an estimated collision time. T is set to a time period within a range of e.g. two to five seconds. Further, H represents a predetermined height for defining a range in the Y direction, that is, in the direction of height, which is set to e.g. a height approximately two times as large as that of the automotive vehicle 10.

Figure 17:
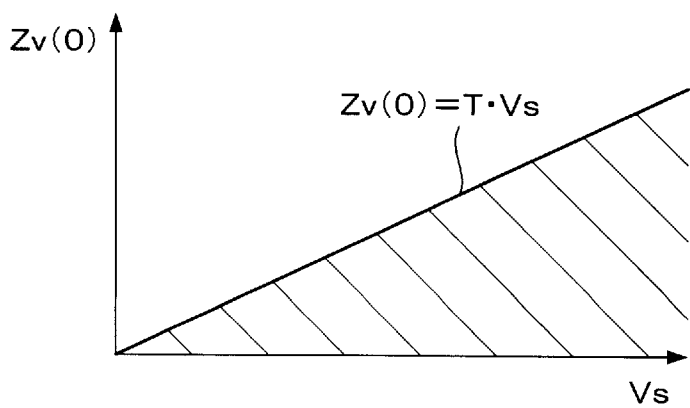
FIG. 17 is a diagram useful in explaining conditions for determining whether or not a warning should be issued.

The relationship implied in the expression (10) can be shown by FIG. 17. When coordinates corresponding to the relative speed Vs and the distance Zv(0) both detected or calculated are within an hatched area in the figure, and at the same time |Yv(0)|≤H holds, determination processes at step 42 et seq. are carried out.

Figure 18:
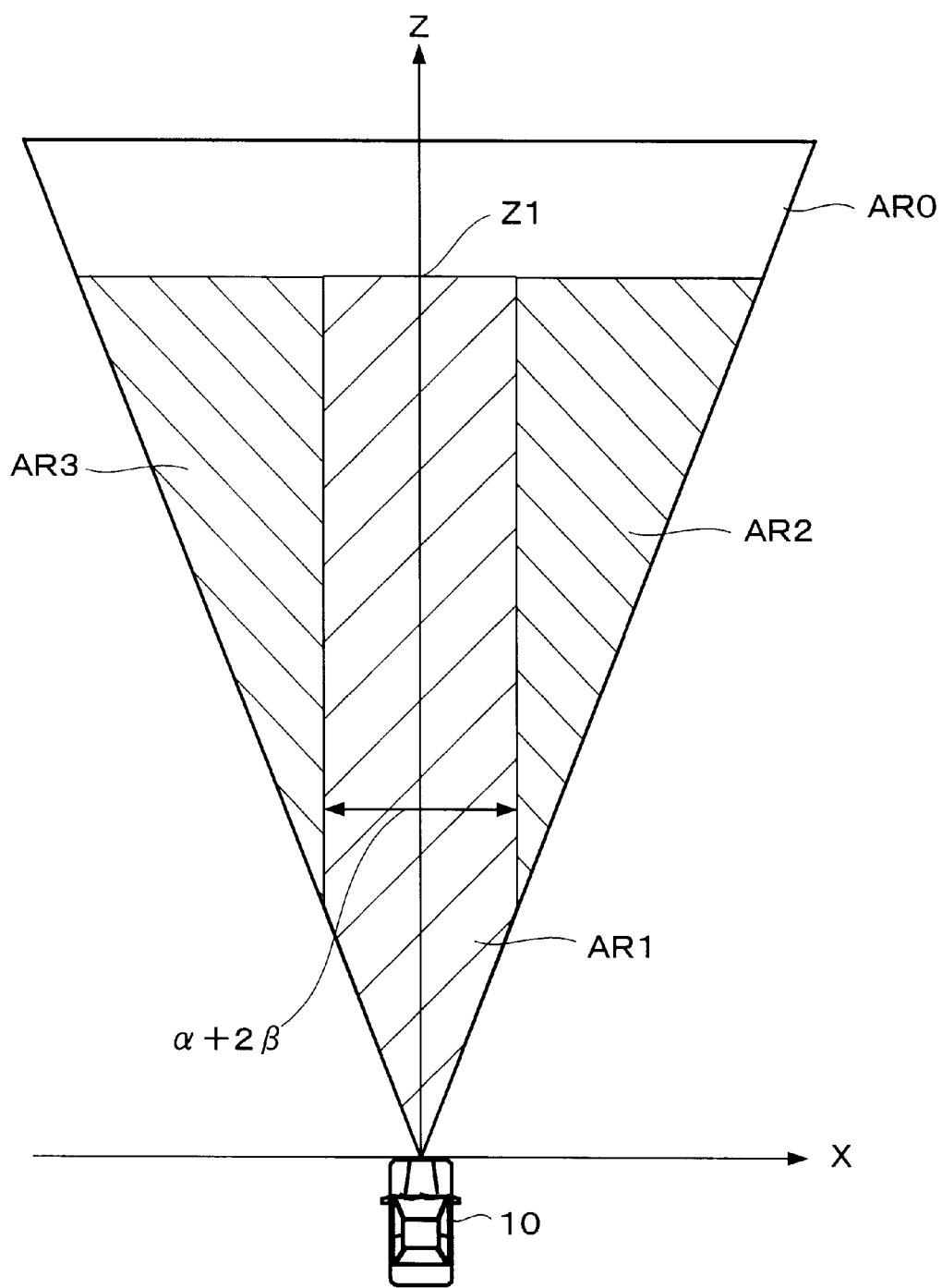
FIG. 18 is a diagram useful in explaining divisional areas in front of the vehicle.

In FIG. 18, an area which can be monitored by the cameras 1R, 1L is shown by an area AR0 defined by an outer triangle indicated by thick solid lines. In the area AR0, areas AR1, AR2, and AR3 which are closer to the automotive vehicle 10 than Z1=Vs×T (vehicle speed×lead time) are set to warning determination areas. Here, the area AR1 is an area corresponding to a range including the width α of the automotive vehicle 10 and allowances β, β (each having a value of e.g. 50 to 100 cm) provided on opposite sides of the vehicle 10, in other words, an area having a width of (α/2+β) on each side of the central axis in the longitudinal direction of the vehicle 10. If the object continues to exist in this area, there is a very high possibility of collision against the vehicle 10. Hence, hereinafter, this area is referred to as the "closing object determination area". The areas AR2, AR3 are areas having X coordinates with larger absolute values than those of X coordinates in the closing object determination area (areas laterally outward of the closing object determination area). An object in one of these areas AR2 and AR3 is subjected to an incoming object collision determination process described hereinafter, for determining the possibility of potential collision of an incoming object. These areas AR2 and AR3 are referred to as the "incoming object determination areas". Further, the above areas have the predetermined height H in the Y direction, as shown in the expression (11).

The answer to the question of step S41 becomes affirmative (Yes) when the object exists in the closing object determination area AR1 or in one of the incoming object determination areas AR2, AR3.

At the following step S42, it is determined whether or not the object exists in the closing object determination area AR1. If the answer to the question of step S42 is affirmative (Yes), the program immediately proceeds to step S44, whereas if the answer is negative (No), the incoming object collision determination process for determining the possibility of potential collision of the incoming object is carried out at step S43. More specifically, it is determined whether or not the following expression (12) is satisfied by the difference between the latest x coordinate xc(0) (as described above, c is added to the symbol to indicate that the symbol represents the x coordinate corrected by causing the center position of the image to coincide with the origin O of the real space coordinate system) and an x coordinate xc(N−1) obtained a time period ΔT earlier. If the following expression (12) is satisfied, it is determined that there is a high possibility of collision.

$$\frac{-\alpha \cdot f}{2}\left(\frac{1}{Zv(0)} - \frac{1}{Zv(N-1)}\right) \leq xc(0) - xc(N-1) \qquad (12)$$
$$\leq \frac{\alpha \cdot f}{2}\left(\frac{1}{Zv(0)} - \frac{1}{Zv(N-1)}\right)$$

Figure 19:
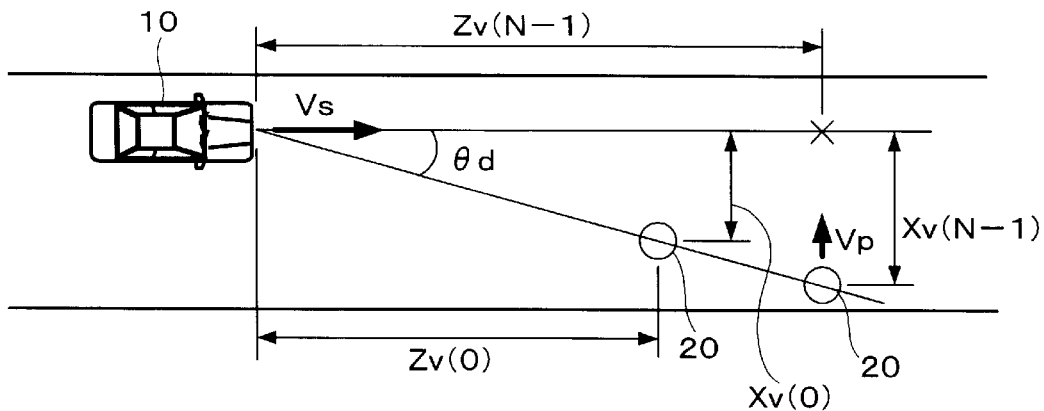
FIG. 19 is a diagram useful in explaining a case in which a collision is liable to occur.
Figure 20:
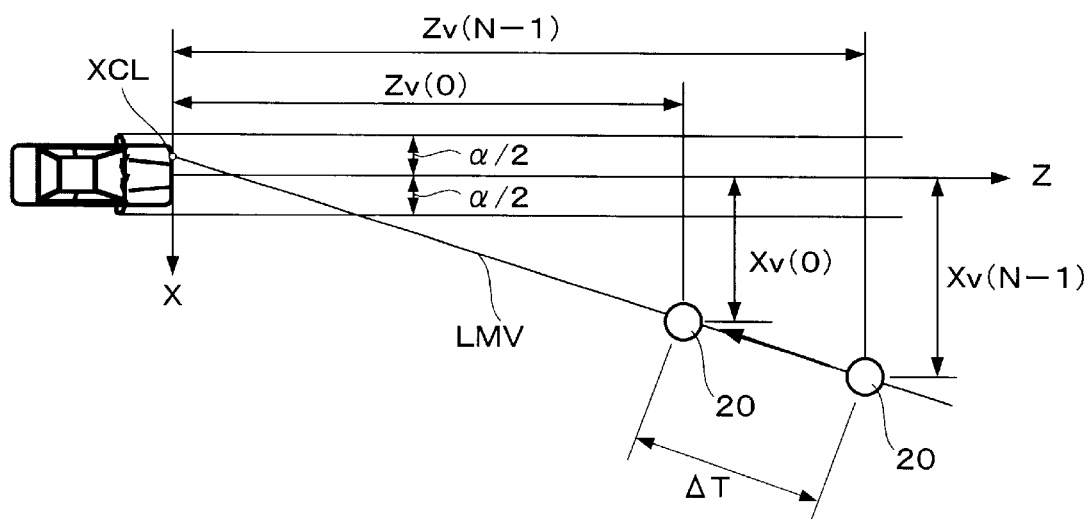
FIG. 20 is a diagram useful in explaining a method of incoming object collision determination dependent on a width of the vehicle.

As shown in FIG. 19, if an animal 20 comes in a direction approximately orthogonal to the direction of running of the automotive vehicle 10, when Xv(N−1)/Zv(N−1)=Xv(0)/Zr(0) holds, in other words, when a ratio Vp/Vs=Xr(N−1)/Zr(N−1) holds (Vp is a speed of the animal 20 and Vs is a relative speed of the vehicle 10), an azimuthal angle θd of the animal 20 as viewed from the vehicle 10 is constant. In this case, there is a high possibility of collision. The expression (12) is used for determining the possibility by taking the width α of the automotive vehicle 10 into account. In the following, a method of deriving the expression (12) will be described with reference to FIG. 20.

When a straight line extending through the latest position coordinates of the object 20 and the position coordinates thereof obtained a time period ΔT earlier, that is, the approximate straight line LMV, intersects an X-Y plane (plane including the X axis and the Y axis, i.e. a plane which contains a line (X axis) corresponding to the front end of the vehicle 10 and extends in a direction perpendicular to the direction of running of the vehicle 10), if the X coordinate of the intersection point thereof is represented by XCL, collision occurrence conditions in which the width a of the vehicle 10 is taken into account are given by the following expression (13):

$$-\alpha/2 \leq XCL \leq \alpha/2 \qquad (13)$$

On the other hand, a straight line formed by projecting the approximate straight line LMV on an X-Z plane is given by the following equation (14):

$$Z - Zv(0) = \frac{Zv(N-1) - Zv(0)}{Xv(N-1) - Xv(0)} \times (X - Xv(0)) \qquad (14)$$

When Z=0, X=XCL are substituted into this equation to calculate XCL, the following equation (15) is obtained:

$$XCL = \frac{Xv(0)/Zv(0) - Xv(N-1)/Zv(N-1)}{1/Zv(0) - 1/Zv(N-1)} \qquad (15)$$

Further, since the real space coordinate X and the coordinate xc on the image have a relationship shown by the above equation (3), the following equations (16) and (17) hold:

$$Xv(0)=xc(0) \times Zv(0)/f \qquad (16)$$

$$Xv(N-1)=xc(N-1) \times Zv(N-1)/f \qquad (17)$$

When the above equations (16) and (17) are applied to the equation (15), the X coordinate XCL of the intersection point is given by the following equation (18):

$$XCL = \frac{xc(0)/f - xc(N-1)/f}{1/Zv(0) - 1/Zv(N-1)} \quad (18)$$

By substituting the XCL into the expression (13), the conditions defined by the above expression (12) are obtained.

Referring again to FIG. 4, when it is determined at step 43 that there is a high possibility of collision, the program proceeds to step S44, whereas when it is determined that there is not a high possibility of collision, the warning determination process is terminated.

At step S44, a warning output determination process is carried out for determining whether or not warning should be issued. First, it is determined from an output signal from the brake sensor whether or not the driver is carrying out braking operation i.e. operating the brake of the vehicle 10. If he is not operating the brake, the program immediately proceeds to step S45 to issue a warning. If he is operating the brake, deceleration Gs generated by the braking operation is calculated (as a positive value). When the deceleration Gs is equal to or smaller than a predetermined threshold GTH, the program proceeds to step S45, whereas when Gs>GTH holds, it is determined that collision can be avoided by the braking operation, followed by terminating the warning determination process. This makes it possible to prevent the driver from being warned when he is carrying out an appropriate braking operation, thereby preventing the driver from being annoyed by unnecessary warnings.

The predetermined threshold GTH is set according to the following equation (19):

$$GTH = \frac{Vs^2}{2 \times Zv(0)} \quad (19)$$

The threshold thus determined corresponds to a condition for stopping the vehicle 10 at a distance of travel equal to or smaller than the distance Zv(0), assuming that the deceleration Gs generated by the braking operation is maintained.

Figure 21A:
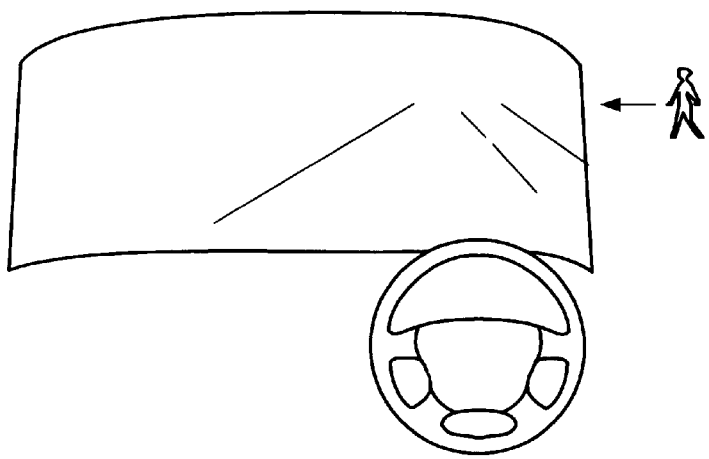
FIG. 21A shows a state where a screen of a head up display is not displayed.
Figure 21B:
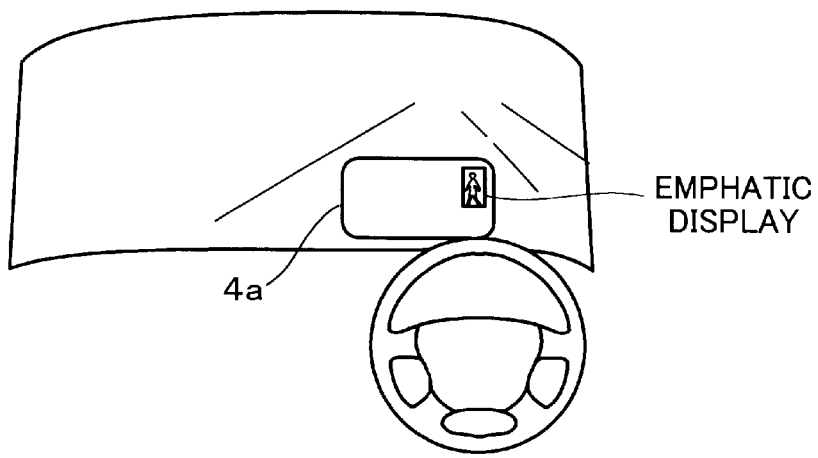
FIG. 21B shows a state where a screen of the head up display is displayed.

At step S45, a voice alarm is generated by the speaker 3, and as shown in FIG. 21B, an image obtained e.g. by the camera 1R is displayed on the screen 4a of the HUD 4 such that a closing object is emphatically displayed (for instance, enclosed in a frame for emphasis). FIG. 21A shows a state where the screen 4a is not displayed, while FIG. 21B shows a state where the screen 4a is displayed. This enables the driver to positively recognize an object having a high possibility of collision against the vehicle 10.

As described above, in the present embodiment, positions of an identical object in the real space are calculated based on a plurality of time series items of position data of the object, and the movement vector of the object is obtained based on its positions in the real space. Then, the possibility of collision between the object and the automotive vehicle 10 is determined based on the movement vector thus calculated, so that differently from the conventional system, it is possible to prevent the occurrence of an erroneous determination, and thereby enhance accuracy of determination of the possibility of collision.

Further, the approximate straight line LMV approximating the locus of relative movement of an object to the automotive vehicle 10 is calculated, and the position coordinates of the object are corrected such that positions of the detected object are on the approximate straight line, and the movement vector of the object is obtained based on the corrected position coordinates. This makes it possible to reduce adverse influence of errors in detecting the positions of the object and more accurately determine the possibility of collision.

Further, since determination of a potential collision is carried out by taking the width α of the vehicle 10 into account, it is possible more accurately determine the possibility of collision and prevent the driver from being unnecessarily warned.

In the present embodiment, the image-processing unit 2 forms relative position-detecting means, movement vector-calculating means, determining means, and part of warning means. More specifically, step S14 to step S19 appearing in FIG. 3 correspond to the relative position-detecting means, step S20 to step S23 in the figure corresponds to the movement vector-calculating means, step S41 to step S44 in FIG. 4 correspond to the determining means, as well as step S45 in FIG. 4 and the speaker 3 and the HUD 4 correspond to the warning means.

It should be noted that the invention is not limited to the above embodiment, but various variations and modifications are possible. For instance, although in the present embodiment, infrared cameras are used as imaging means, this is not limitative, but TV cameras capable of detecting only normal visible rays, as disclosed in Japanese Laid-Open Patent Publication (Kokai) No. 9-226490, may be employed. By using infrared cameras, however, the extraction process for extracting an animal or a running vehicle can be simplified, and the system can be realized by using an arithmetic unit having relatively low performance.

Further, although in the above embodiment, an example which monitors a front portion of the environment of an automotive vehicle is shown, this is not limitative, but the system may be configured such that any portions of the environment in any directions, including a rear portion thereof, can be monitored.

It is further understood by those skilled in the art that the foregoing is a preferred embodiment of the invention, and that various changes and modifications may be made without departing from the spirit and scope thereof. The scope of the invention is indicated by the appended claims.

What is claimed is:

1. A vehicle environment monitoring system for an automotive vehicle, which detects an object existing in an environment of said automotive vehicle from an image obtained by imaging means mounted on said automotive vehicle, the vehicle environment monitoring system comprising:

relative position-detecting means for detecting a relative position of said object to said automotive vehicle from said image obtained by said imaging means to obtain position data;

movement vector-calculating means for calculating positions of said object in a real space based on a plurality of time series items of said position data detected on said object by said relative position-detecting means, and calculating a movement vector of said object based on said positions in said real space; and determining means for determining whether or not said object has a high possibility of collision against said automotive vehicle based on said movement vector;

said movement vector-calculating means including approximate straight line-calculating means for calculating an approximate straight line approximating a locus of relative movement of said object, and position data-correcting means for correcting said time series items of said position data by using said approximate straight line, said movement vector-calculating means calculating said movement vector based on the corrected time series items of said position data.

2. A vehicle environment monitoring system for an automotive vehicle, which detects an object existing in an environment of said automotive vehicle from an image obtained by imaging means mounted on said automotive vehicle, the vehicle environment monitoring system comprising:

relative position-detecting means for detecting a relative position of said object to said automotive vehicle from said image obtained by said imaging means to obtain position data;

movement vector-calculating means for calculating positions of said object in a real space based on a plurality of time series items of said position data detected on said object by said relative position-detecting means, and calculating a movement vector of said object based on said positions in said real space; and determining means for determining whether or not said object has a high possibility of collision against said automotive vehicle based on said movement vector;

said determining means carries out said determination by applying conditions for determining a potential collision, said conditions being dependent on a width of said vehicle.

3. A vehicle environment monitoring system according to claim 1, wherein said determining means carries out said determination by applying conditions for determining a potential collision, said conditions being dependent on a width of said vehicle.

4. A vehicle environment monitoring system according to claim 1, wherein said approximate straight line-calculating means calculates said approximate straight line as a three-dimensional straight line including data of a height of said object.

5. A vehicle environment monitoring system for an automotive vehicle, which detects an object existing in an environment of said automotive vehicle from an image obtained by imaging means mounted on said automotive vehicle, the vehicle environment monitoring system comprising:

relative position-detecting means for detecting a relative position of said object to said automotive vehicle from said image obtained by said imaging means to obtain position data;

movement vector-calculating means for calculating positions of said object in a real space based on a plurality of time series items of said position data detected on said object by said relative position-detecting means, and calculating a movement vector of said object based on said positions in said real space; and determining means for determining whether or not said object has a high possibility of collision against said automotive vehicle based on said movement vector;

said imaging means comprising two infrared cameras capable of detecting infrared rays.

6. A vehicle environment monitoring system for an automotive vehicle, which detects an object existing in an environment of said automotive vehicle from an image obtained by imaging means mounted on said automotive vehicle, the vehicle environment monitoring system comprising:

relative position-detecting means for detecting a relative position of said object to said automotive vehicle from said image obtained by said imaging means to obtain position data;

movement vector-calculating means for calculating positions of said object in a real space based on a plurality of time series items of said position data detected on said object by said relative position-detecting means, and calculating a movement vector of said object based on said positions in said real space; and determining means for determining whether or not said object has a high possibility of collision against said automotive vehicle based on said movement vector;

said imaging means comprising two TV cameras for detecting infrared rays or visible rays, and said relative position-detecting means including search area-setting means for setting, based on a position of an object image contained in an image output from one of said two TV cameras, a search area within an image output from the other of said two TV cameras for searching for a corresponding object image contained in said image output from the other of said two TV cameras;

corresponding object image-identifying means for identifying said corresponding object image by carrying out a correlation operation on data within said search area; and distance-calculating means for calculating a distance from said vehicle to said object based on a parallax between said object image and said corresponding object image.

7. A vehicle environment monitoring system according to claim 6, wherein said data within said search area is gray scale data containing halftone information.

8. A vehicle environment monitoring system according to claim 7, wherein said relative position-detecting means includes tracking means for tracking an object moving in said image obtained by said imaging means by using binary data formed by binarizing said gray scale data.

9. A vehicle environment monitoring system according to claim 8, wherein said tracking means recognizes said object being tracked by using run length data encoded from said binary data.

10. A vehicle, environment monitoring system according to claim 9, wherein said tracking means determines an identity of said object being tracked, based on position coordinates of a centroid of an image thereof, an area of said image thereof, and an aspect ratio of a rectangle circumscribing said image thereof.

11. A vehicle environment monitoring system for an automotive vehicle, which detects an object existing in an environment of said automotive vehicle from an image obtained by imaging means mounted on said automotive vehicle, the vehicle environment monitoring system comprising:

relative position-detecting means for detecting a relative position of said object to said automotive vehicle from said image obtained by said imaging means to obtain position data;

movement vector-calculating means for calculating positions of said object in a real space based on a plurality of time series items of said position data detected on said object by said relative position-detecting means, and calculating a movement vector of said object based on said positions in said real space;

determining means for determining whether or not said object has a high possibility of collision against said automotive vehicle based on said movement vector; and warning means for warning a driver, when it is determined by said determining means that there is a high possibility of collision against said object, said warning means being inhibited from warning said driver when said driver is carrying out a braking operation and at the same time deceleration caused by said braking operation is larger than a predetermined threshold.

* * * * *

UNITED STATES PATENT AND TRADEMARK OFFICE
CERTIFICATE OF CORRECTION

PATENT NO.    : 6,327,536 B1
DATED         : December 4, 2001
INVENTOR(S)   : T. Tsuji, N. Nagaoka, M. Watanabe and H. Hattori It is certified that error appears in the above-identified patent and that said Letters Patent is hereby corrected as shown below:

Column 1,
Line numbered between 8 and 9, change "the vehicle" to -- the system --.
Line 18, change "9-226490, the" to -- 9-226490. The --.

Column 2,
Line 4, change "position data, the and" to -- the position data, and --.
Line 44, delete the comma.
Line 45, after "line" insert a comma.
Line 52, before "run-" insert -- a --.

Column 5,
Lines 9-10, continue as the same paragraph.

Column 6,
Line 14, change "is" to -- are --.
Line 55, change "$\Delta A$" to -- $\Delta S$ --.

Column 7,
Line 18, change "20" to -- S20 --.
Line 19, change "20" to -- S20 --.
Line 21, change "S19 and 20" to -- S19 and S20 --.

Column 8,
Line 40 (equation (3)), change " $\begin{bmatrix} X \\ Y \\ Z \end{bmatrix} = \begin{bmatrix} xc \times z/f \\ yc \times z/f \\ z \end{bmatrix}$  $f = F/p$" to -- $\begin{bmatrix} X \\ Y \\ Z \end{bmatrix} = \begin{bmatrix} xc \times z/f \\ yc \times z/f \\ z \end{bmatrix}$ $f = F/p$ --.

UNITED STATES PATENT AND TRADEMARK OFFICE
CERTIFICATE OF CORRECTION

PATENT NO. : 6,327,536 B1
DATED : December 4, 2001
INVENTOR(S) : T. Tsuji, N. Nagaoka, M. Watanabe and H. Hattori It is certified that error appears in the above-identified patent and that said Letters Patent is hereby corrected as shown below:

Column 10,
Line 40, before "Xv(N-1)" insert -- ( --; after "Zv(N-1)" insert -- ) --.

Column 11,
Line 31, change "42" to -- S42 --.

Column 12,
Line 39, change "width a" to -- width $\alpha$ --.

Column 13,
Line numbered between 7 and 8, change "step 43" to -- step S43 --.

Column 14,
Line 3, before "more" insert -- to --.

Column 16,
Line 33 (in the 1st line of Claim 10), after "vehicle" delete the comma.

Signed and Sealed this

Third Day of September, 2002

Attest:

Attesting Officer

JAMES E. ROGAN
*Director of the United States Patent and Trademark Office*